(12) United States Patent
Agiwal et al.

(10) Patent No.: US 9,992,197 B2
(45) Date of Patent: Jun. 5, 2018

(54) METHOD AND SYSTEM FOR SECURED COMMUNICATION OF CONTROL INFORMATION IN A WIRELESS NETWORK ENVIRONMENT

(71) Applicant: Samsung Electronics Co., Ltd., Suwon-si, Gyeonggi-do (KR)

(72) Inventors: Anil Agiwal, Bangalore (IN); Hyun-Jeong Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days. days.

(21) Appl. No.: 14/368,170

(22) PCT Filed: Dec. 24, 2012

(86) PCT No.: PCT/KR2012/011349
§ 371 (c)(1),
(2) Date: Jun. 23, 2014

(87) PCT Pub. No.: WO2013/095074
PCT Pub. Date: Jun. 27, 2013

(65) Prior Publication Data
US 2014/0372758 A1    Dec. 18, 2014

(30) Foreign Application Priority Data
Dec. 23, 2011 (IN) .......................... 4551/CHE/2011

(51) Int. Cl.
*H04L 29/06* (2006.01)
*H04W 12/04* (2009.01)
*H04W 12/02* (2009.01)

(52) U.S. Cl.
CPC ......... *H04L 63/0876* (2013.01); *H04W 12/02* (2013.01); *H04W 12/04* (2013.01)

(58) Field of Classification Search
CPC .... H04W 12/04; H04W 12/02; H04L 63/0876
(Continued)

(56) References Cited

U.S. PATENT DOCUMENTS 9,225,518 B2 *  12/2015  Mizikovsky .......... H04L 9/0836
2008/0137853 A1   6/2008  Mizikovsky et al.
(Continued)

FOREIGN PATENT DOCUMENTS

CN    102047629 A    5/2011
CN    102144371 A    8/2011
(Continued)

OTHER PUBLICATIONS

IEEE Standard for Local and metropolitan area networks Part 16: Air Interface for Fixed and Mobile Broadband Wireless Access Systems Amendment 2: Physical and Medium Access Control Layers for Combined Fixed and Mobile Operation in Licensed Bands, Published Feb. 28, 2006, 864 pages. (Year: 2006).*
(Continued)

*Primary Examiner* — Michael Pyzocha
(74) *Attorney, Agent, or Firm* — Jefferson IP Law, LLP

(57) ABSTRACT

A method and system for securely communicating control information in a wireless network environment is provided. When a transmitting station has to transmit control information to a receiving station, the transmitting station determines whether the control information belongs to first type or second type. If the control information is the second type of control information, the transmitting station secures the second type of control information using a counter value, a Cipher based Message Authentication Code (CMAC) value and security keys computed for protecting the second type of control information. Upon securing the control information, the transmitting station transmits the secured control information to a receiving station.

32 Claims, 16 Drawing Sheets

(58) Field of Classification Search
USPC .......................................................... 713/170
See application file for complete search history.

(56) References Cited

U.S. PATENT DOCUMENTS

| | | | | |
|---|---|---|---|---|
| 2008/0155658 | A1* | 6/2008 | Leinonen | H04L 63/08 |
| | | | | 726/4 |
| 2009/0164788 | A1* | 6/2009 | Cho | H04L 63/061 |
| | | | | 713/175 |
| 2010/0098247 | A1* | 4/2010 | Suumaki | H04L 9/0866 |
| | | | | 380/44 |
| 2011/0044454 | A1* | 2/2011 | Baek | H04W 12/04 |
| | | | | 380/273 |
| 2011/0154029 | A1 | 6/2011 | Hahn et al. | |
| 2012/0011569 | A1* | 1/2012 | Chou | H04L 9/0637 |
| | | | | 726/4 |
| 2013/0070674 | A1* | 3/2013 | Lin | H04W 60/06 |
| | | | | 370/328 |
| 2013/0077579 | A1* | 3/2013 | Cho | H04W 4/005 |
| | | | | 370/329 |
| 2014/0310784 | A1* | 10/2014 | Cho | H04W 12/08 |
| | | | | 726/4 |

FOREIGN PATENT DOCUMENTS

| | | |
|---|---|---|
| JP | 2011-045064 A | 3/2011 |
| JP | 2011-510571 A | 3/2011 |
| JP | 2011-524669 A | 9/2011 |
| JP | 2011-530260 A | 12/2011 |
| WO | 2006/096017 A1 | 9/2006 |
| WO | 2006/098552 A1 | 9/2006 |
| WO | 2009/092115 A2 | 7/2009 |
| WO | 2010/030127 A2 | 3/2010 |

OTHER PUBLICATIONS

Tsung-Yu Tsai, Yi-Ting Lin, Abnormal Power Down Indication Procedure Using Abnormal Power Down Header, IEEE C80216p-11/0336r1, Internet <URL: http://ieee802.org/16/m2m/contrib/C80216p-11_0336r1.doc>, Nov. 8, 2011.

Heejeong Cho, Youngsoo Yuk et al., Abnormal power down reporting in Wireless MAN Air Interface for Broadband Wireless Access Systems, IEEE 802.16p-11/0289r6 , Internet <URL: http://ieee802.org/16/m2m/contrib/C80216p-11_0289r6.doc>, Nov. 10, 2011.

Inuk Jung, Kiseon Ryu et al.,IEEE802.16e Security support for Group Management in M2M environment, IEEE 802.16p-11/0193r1, Internet <URL: http://ieee802.org/16/m2m/contrib/C80216p-11_0193r1.doc>, Jul. 19, 2011.

Anil Agiwal, Hyunjeong Kang et al., Abnormal Power Down Indication, IEEE 802.16-12-0024-00-010b, Internet <URL: https://mentor.ieee.org/802.16/dcn/12/16-12-0024-00-010b-abnormal-power-down-indication.doc>, Jan. 6, 2012.

* cited by examiner

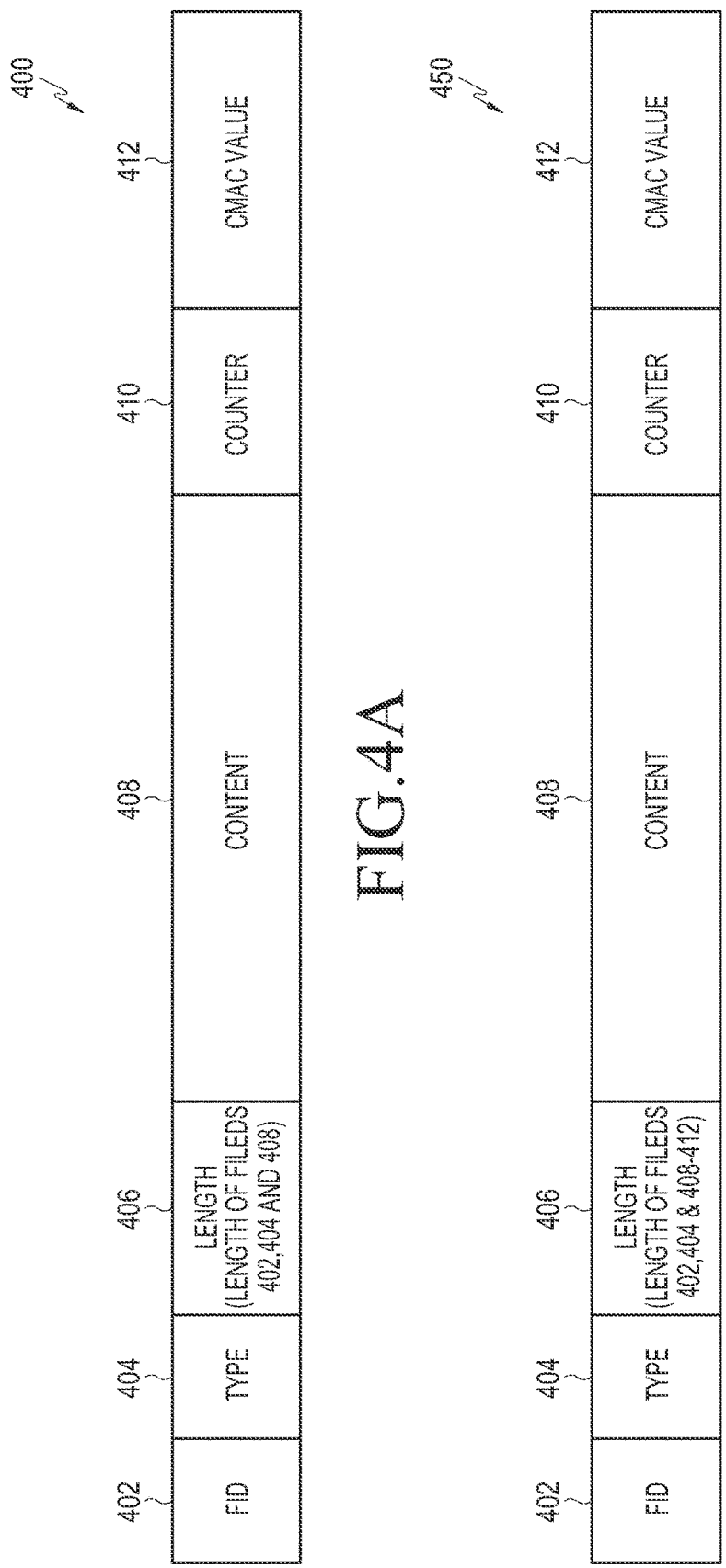

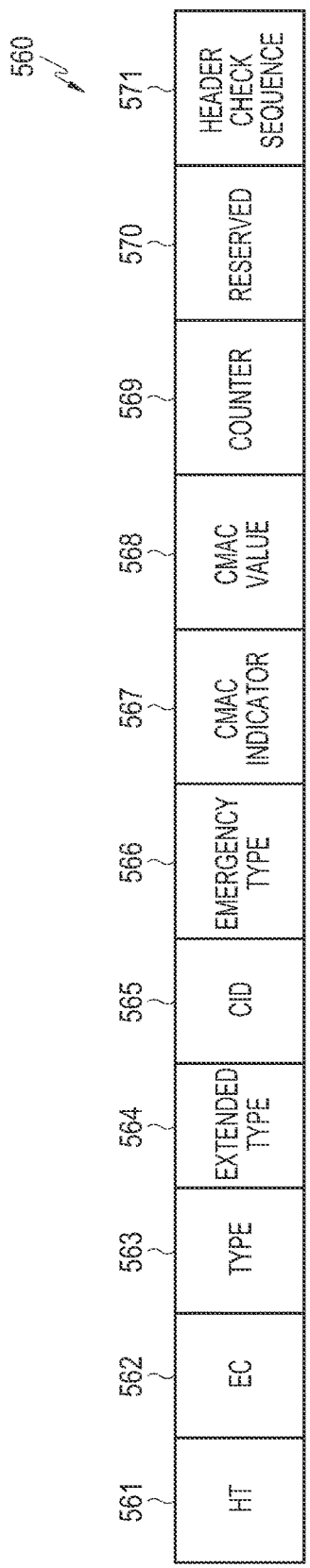
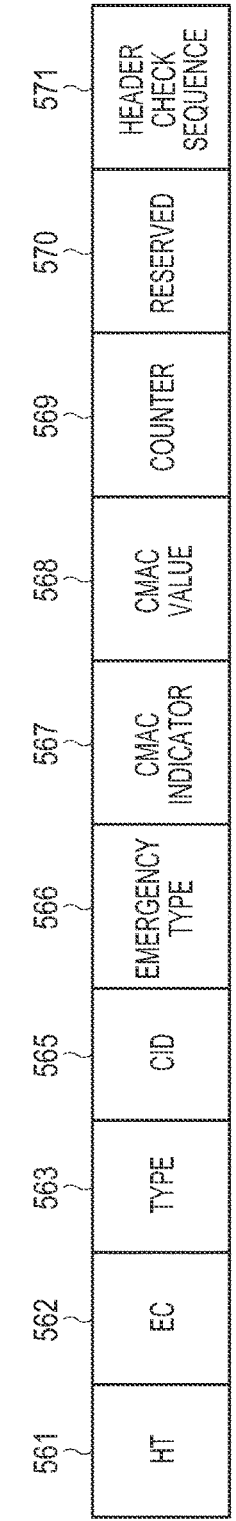
FIG.5C
FIG.5D

METHOD AND SYSTEM FOR SECURED COMMUNICATION OF CONTROL INFORMATION IN A WIRELESS NETWORK ENVIRONMENT

CROSS-REFERENCE TO RELATED APPLICATION(S)

This application is a U.S. National Stage application under 35 U.S.C. § 371 of an International application filed on Dec. 24, 2012 and assigned application number PCT/KR2012/011349, which claimed the benefit of an Indian patent application filed on Dec. 23, 2011 in the Indian Intellectual Property Office and assigned Serial number 4551/CHE/2011, the entire disclosure of which is hereby incorporated by reference.

TECHNICAL FIELD

The present disclosure relates to the field of wireless communication. More particularly, the present disclosure relates to securely communicating control information in a wireless network environment.

BACKGROUND

Broadband wireless networks based on various standards (e.g., Institute for Electronic and Electrical Engineers (IEEE) 802.16e based Worldwide Interoperability for Microwave Access (WiMAX) standard and the evolution thereof to IEEE 802.16m) provide various types of services such as voice, packet data, and/or the like. Recently; IEEE 802.16m and IEEE 802.16e based standards are being considered to enable Machine to Machine (M2M) communications for applications such as smart grid, vehicular tracking, healthcare, and/or the like. The security is one of the important requirements of the standards as the standards will be used for many critical applications such as health care and smart grid.

Several types of control information is exchanged between a mobile station or M2M device and a base station to communicate with each other. Typically, control information is exchanged in the form of control messages which are transmitted on signaling connection or flow established between the M2M device and the base station. According to the related art, control messages are protected using cipher based message authentication code (CMAC) algorithm, where a 8 byte CMAC is generated using the CMAC construction as specified in National Institute of Standards and Technology (NIST) Special Publication 800-38B and appended to the control message before transmission on the signaling connection or flow. Optionally, the content of the control message may also be encrypted. A 3 byte counter or packet number (PN) is also used to provide protection against replay attack. The counter is incremented after transmission of every control message. The tuple <control security key, PN> is never repeated. The sequence number of the security key used to generate the CMAC is also transmitted together with the control message. The method of protecting the control messages adds an overhead of 12 bytes to each control message. Typically, the control message protected using the CMAC value is carried in a medium access control (MAC) protocol data unit (PDU). The MAC PDU carrying the protected control message includes of a MAC header and a payload. The payload includes the control message followed by security information including security key sequence number, reserved bits, the packet number and the CMAC value.

Control information is also exchanged in the form of MAC signaling headers which are special type of MAC headers. The MAC signaling headers are transmitted to a receiving station in MAC PDUs. It can be noted that, a MAC PDU carrying a MAC signaling header does not include any payload other than the MAC signaling header. MAC signaling headers are very short in size (several bytes) but carry vital information. Generally, MAC signaling headers are 6 to 7 bytes in size. The MAC signaling header may include a flow identifier field, a type field, a length field, and a content field. The flow identifier field indicates a flow identifier associated with the MAC signaling header. The type field indicated the type of MAC signaling header. The length field indicates the length of the MAC signaling header. The content field carry actual content of the MAC signaling header, according to the related art. MAC signaling headers are exchanged between a mobile station or M2M device and a base station in an unsecured manner.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for secured communication of control information in a wireless network environment.

Techniques of protecting control messages according to the related art cannot be applied to the medium access control (MAC) signaling headers as large overhead may get added to the size of the MAC signaling header as compared to the control information itself.

In accordance with an aspect of the present disclosure, a method of securing control information in a wireless communication environment is provided. The method includes generating, at a transmitting station, one or more security keys for securing a first type of control information and one or more security keys for securing a second type of control information, computing a first type of counter for the first type of control information and a second type of counter for the second type of control information, computing a first type of cipher based message authentication code (CMAC) for the first type of control information and a second type of CMAC for the second type for control information, securing the first type of control information using the first type of CMAC, the first type of counter and the one or more security keys derived for the first type of control information, and securing the second type of control information using the second type of CMAC, the second type of counter, and the one or more security keys derived for the second type of control information.

In accordance with another aspect of the present disclosure, a transmitting station is provided. The transmitting station includes a processor, and a memory communicatively coupled to the processor, wherein the memory includes a control information protection module configured for generating one or more security keys for securing a first type of control information and one or more security keys for securing a second type of control information, computing a first type of counter for the first type of control information and a second type of counter for the second type of control information, computing a first type of CMAC for the first type of control information and a second type of CMAC for the second type for control information, securing the first type of control information using the first type of CMAC, the first type of counter and the one or more security keys derived for the first type of control information, and securing the second type of control information using the second type of CMAC, the second type of counter, and the one or more security keys derived for the second type of control information.

In accordance with another aspect of the present disclosure, a method of securely communicating signaling headers in a wireless communication environment is provided. The method includes computing, by a transmitting station, a counter value for a signaling header to be securely transmitted to a receiving station, computing a CMAC value for the signaling header, securing the signaling header using the CMAC value, the counter value and one or more security keys derived for the signaling header, and transmitting the secured signaling header to the receiving station.

In accordance with another aspect of the present disclosure, a transmitting station is provided. The transmitting station includes a processor, and a memory communicatively coupled to the processor, wherein the memory includes a control information protection module configured to compute a counter value for a signaling header to be securely transmitted to a receiving station, to compute a CMAC value for the signaling header, to secure the signaling header using the CMAC value, the counter value and one or more security keys derived for the signaling header, and to transmit the secured signaling header to the receiving station.

In accordance with another aspect of the present disclosure, a method of processing a signaling header received from a transmitting station is provided. The method includes determining whether a signaling header received from the transmitting station is protected, validating a counter value in the signaling header, determining a frame number of a frame in which the signaling header is received from the transmitting station if the counter value is valid, computing a CMAC value based on the counter value, the frame number, an authentication key identifier, a mobile station logical address, a flow identifier, and the content of the signaling header, determining whether the computed CMAC value matches the CMAC value in the signaling header, and processing the content of the signaling header if the computer CMAC value matches with the CMAC value in the signaling header.

In accordance with another aspect of the present disclosure, a receiving station is provided. The receiving station includes a processor, and a memory communicatively coupled to the processor, wherein the memory includes a control information processing module configured to determine whether a signaling header received from a transmitting station is protected, to validate a counter value in the signaling header, to determine a frame number of a frame in which the signaling header is received from the transmitting station if the counter value is valid, to compute a CMAC value based on the counter value, the frame number, an authentication key identifier, a mobile station logical address, a flow identifier, and the content of the signaling header, to determine whether the computed CMAC value matches the CMAC value in the signaling header, and to process the content of the signaling header if the computer CMAC value matches with the CMAC value in the signaling header.

In accordance with another aspect of the present disclosure, a method of securely transmitting a signaling header in a wireless network environment is provided. The method includes generating security key information for securing a signaling header to be transmitted to a receiving station, appending the security key information with the content of the signaling header, generating a cyclic redundancy check (CRC) value for the security key information appended with the content of the signaling header, appending the CRC value with the content of the signaling header, and transmitting the signaling header with the CRC value appended to the content of the signaling header to the receiving station.

In accordance with another aspect of the present disclosure, a transmitting station is provided. The transmitting station includes a processor, and a memory communicatively coupled to the processor, wherein the memory includes a control information protection module configured to generate security key information for securing a signaling header to be transmitted to a receiving station, to append the security key information with the content of the signaling header, to generate a CRC value for the security key information appended with the content of the signaling header, to append the CRC value with the content of the signaling header, and to transmit the signaling header with the CRC value appended to the content of the signaling header to the receiving station.

In accordance with another aspect of the present disclosure, a method of processing a protected signaling header in a wireless network environment is provided. The method includes generating security key information upon receiving a protected signaling header with a CRC value from a transmitting station, appending the security key information with the content of the signaling header, generating a CRC value based on the security key information appended with the content of the signaling header, determining whether the generated CRC value matches with the CRC value in the signaling header, and processing the content of the signaling header if the generated CRC value matches with the CRC value in the signaling header.

In accordance with another aspect of the present disclosure, a method of processing a protected signaling header in a wireless network environment is provided. The method includes generating security key information upon receiving a protected signaling header with a CRC value from a transmitting station, appending the security key information with the content of the signaling header, generating a CRC value based on the security key information appended with the content of the signaling header, determining whether the generated CRC value matches with the CRC value in the signaling header, and processing the content of the signaling header if the generated CRC value matches with the CRC value in the signaling header.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4A illustrates a format of a protected Medium Access Control (MAC) signaling header according to an embodiment of the present disclosure.

FIG. 4B illustrates a format of a protected MAC signaling header according to an embodiment of the present disclosure.

FIG. 5C illustrates a format of a protected abnormal power down signaling header according to an embodiment of the present disclosure.

FIG. 5D illustrates a format of a protected abnormal power down signaling header according to an embodiment of the present disclosure.

Throughout the drawings, like reference numerals will be understood to like parts, components, and structures.

DETAILED DESCRIPTION

Figure 1:
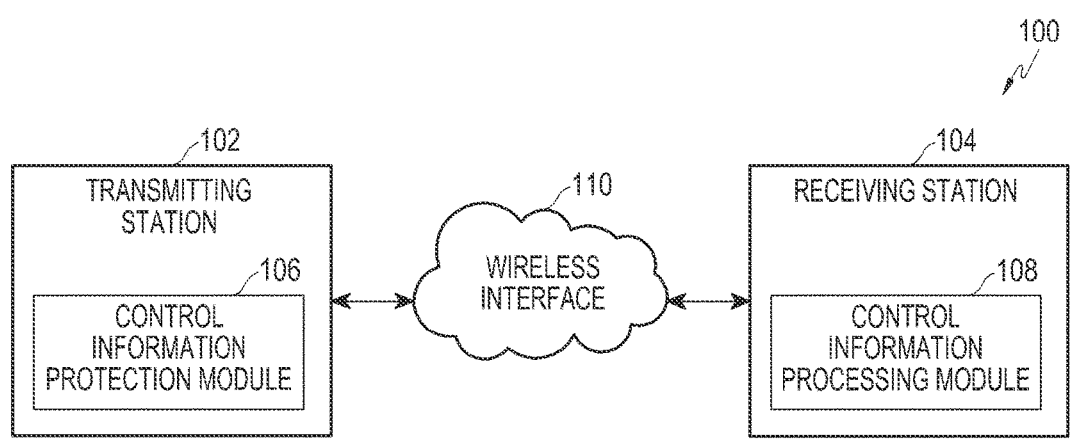
FIG. 1 illustrates a block diagram of a wireless networks system for securely communicating control information between a transmitting station and a receiving station according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the document, the terms 'secured' and 'protected' means the same and are interchangeably used.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (MID), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, a transmitting station may be an electronic device. According to various embodiments of the present disclosure, a receiving station may be an electronic device.

FIG. 1 illustrates a block diagram of a wireless network system for securely communicating control information between a transmitting station and a receiving station according to an embodiment of the present disclosure.

Referring to FIG. 1, the system 100 includes a transmitting station 102, a receiving station 104 and a wireless interface 110. The transmitting station 102 may include a control information protecting module 106, and the receiving station 104 may include a control information processing module 108. The transmitting station 102 may be a mobile station or a base station. The receiving station 104 may be a base station or a mobile station.

When the transmitting station 102 has to transmit control information to the receiving station 104, the control information protecting module 106 determines whether the control information is to be protected. If the control information is to be protected, the control information protecting module 106 determines whether the control information belongs to first type or second type. For example, the first type of control information may include control messages (e.g., management messages in Institute for Electronic and Electrical Engineers (IEEE) 802.16.1 system, radio resource connection control messages in a Long Term Evolution (LTE) system, and/or the like) to be transmitted over an established signaling connection/flow. The second type of control information may include signaling headers (e.g., standalone signaling headers in the IEEE 802.16.1 system, medium access control MAC signaling headers in the LTE system). The second type of control information may be up to 7 bytes in size.

If the control information is the first type of control information, the control information protection module 106 secures the first type of control information using a first type of counter, a first type of a cipher based message authentication code (CMAC) value, and security keys computed for protecting the first type of control information.

If the control information is the second type of control information, the control information protection module 106 secures the second type of control information using a second type of counter value, a second type of CMAC value, and security keys computed for protecting the second type of control information.

Upon securing the control information, the transmitting station 102 transmits the secured control information to the receiving station 104 over the wireless interface 110.

Upon receiving the secured control information, the receiving station 104 (e.g., the control information processing module 108) determines the type of control information received from the transmitting station 102. Accordingly, the control information processing module 108 decodes the received control information based on the type of control information. The process of securing the control information and processing the secured control information is described in greater detail in the following description.

Figure 2:
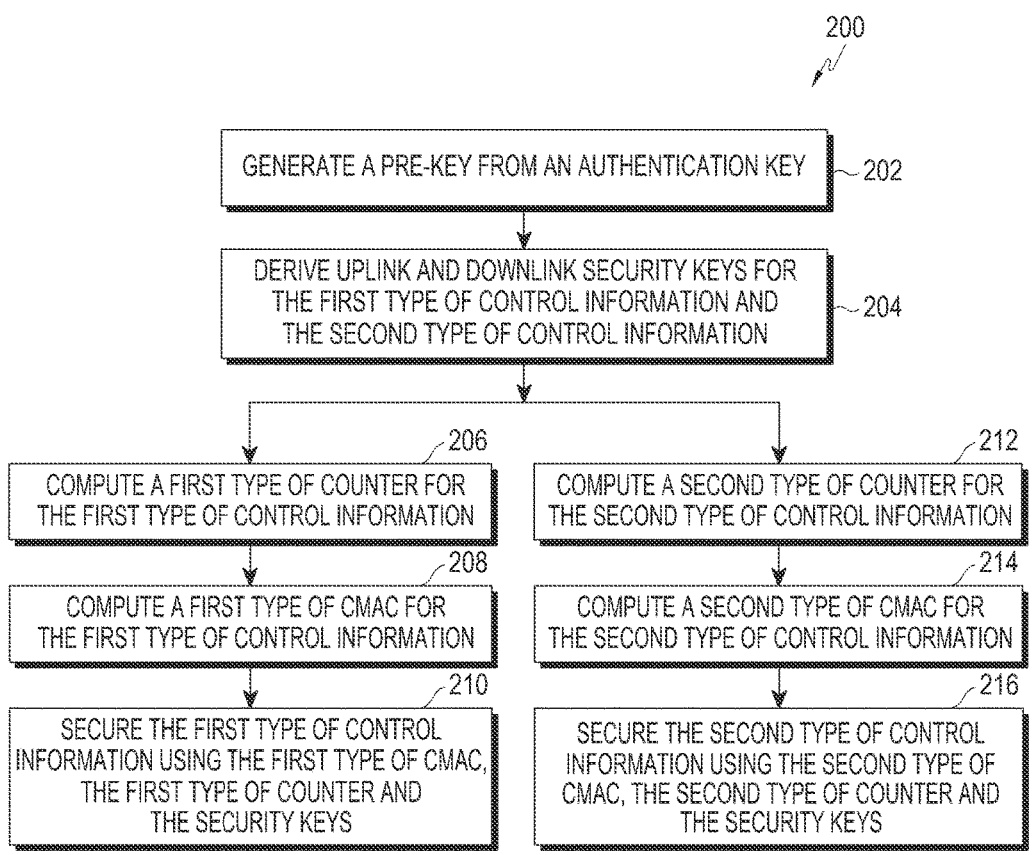
FIG. 2 is a flowchart illustrating a method of securing control information to be transmitted to the receiving station according to an embodiment of the present disclosure.

FIG. 2 is a flowchart illustrating a method of securing control information to be transmitted to a receiving station according to an embodiment of the present disclosure.

Referring to FIG. 2, the transmitting station 102 transmits two types of control information to the receiving station 104. Both types of control information carry important information, hence it may be preferable to securely transmit such information to the receiving station 104. For example, both types of control information needs to be securely transmitted to the receiving station 104. The process flowchart 200 provides method steps for securing the first type and second type of control information prior to transmitting the same to the receiving station 104.

At operation 202, a pre-key is generated from an authentication key (AK). According to various embodiments of the present disclosure, the authentication key may be mutually derived at the transmitting station 102 (e.g., a base station) and the receiving station 104 (e.g., a mobile station) during authorization process. The length of the authentication key may be 160 bits. The pre-key may be used to generate distinct uplink and downlink security keys for securing the first type of control information and the second type of control information respectively.

At operation 204, uplink and downlink security keys for the first type of control information and uplink and/or downlink security keys for the second type of control information are derived from the pre-key. For example, the uplink security key may be used for authenticating control information transmitted in uplink while the downlink security key may be used for authenticating control information transmitted in downlink. According to various embodiments of the present disclosure, the length of the uplink and downlink security keys for the first and second types of control information is 128 bits. According to various embodiments of the present disclosure, the length of the uplink and downlink security keys for the first and second types of control information can be of different size. It can be noted that, the process of deriving security keys from a pre-key is well known to the person skilled art and the explanation is thereof omitted. New security keys are generated periodically according to the methods illustrated in FIGS. 7A through 7C.

At operation 206, a first type of counter for the first type of control information is computed. For example, a first type of counter may be a packet number (PN) of a MAC PDU in which the first type of control information will be transmitted. According to various embodiments of the present disclosure, a packet number for the first type of control information is determined. According to such embodiments of the present disclosure, the first type of counter is computed based on the first type of control information.

At operation 208, a first type of CMAC for the first type of control information is computed. The first type of CMAC is computed based on a CMAC construction as specified in National Institute of Standards and Technology (NIST) Special Publication 800-38B. For example, the first type of CMAC is equal to truncate (Security key for first type of control information, authentication key identifier|PN|Mobile station logical address|Flow Identifier|Zero Padding|first type of control information, 64).

At operation 210, the first type of control information is secured using the first type of CMAC, the first type counter, and the security keys derived for the first type of control information. The method of computing the first type of counter and the first type of CMAC for securing the first type of control information is also well known to the person skilled in the art and hence the explanation is thereof omitted.

The operations 212 to 216 illustrate a process for securing the second type of control information such as signaling headers, according to various embodiments of the present disclosure.

At operation 212, a second type of counter for the second type of control information is computed.

At operation 214, a second type of CMAC for the second type of control information is computed. The second type of CMAC is computed based on a CMAC construction as specified in NIST Special Publication 800-38B. For example, the second type of CMAC is equal to truncate (Security key for second type of control information, authentication key identifier|Frame number|Mobile station logical address|Flow Identifier|Second Type of Counter Value|Zero Padding|second type of control information, 16).

At operation 216, the second type of control information is secured using the second type of CMAC, the second type of counter, and the security keys derived for the second type of control information.

According to various embodiments of the present disclosure, the second type of information appended with the second type of CMAC and the second type of counter is transmitted to the receiving station 104. It can be noted that, the second type of counter and the second type CMAC are distinct from the first type of counter and the first type of CMAC and are suitable for securing the second type of control information. For example, the second type of CMAC may be of smaller length compared to the first type CMAC and may be computed using methods different than the method used to compute the first type of CMAC. According to various embodiments of the present disclosure, the second type of counter and the second type of CMAC are computed such that the total size of a packet including the secured second type of control information, the second type CMAC and the second type of counter does not exceed a threshold permissible size of the secured second type of control information. A detailed process of securing the second type of control information such as signaling headers is explained in greater detail in FIGS. 3A and 3B.

Figure 3A:
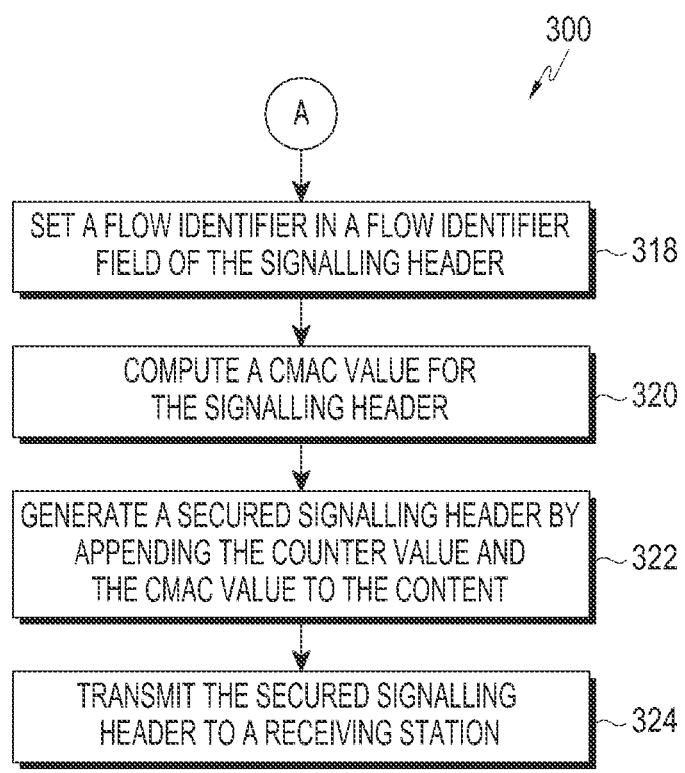
FIGS. 3A and 3B are flowcharts of a detailed method of securing a signaling header according to an embodiment of the present disclosure.
Figure 3B:
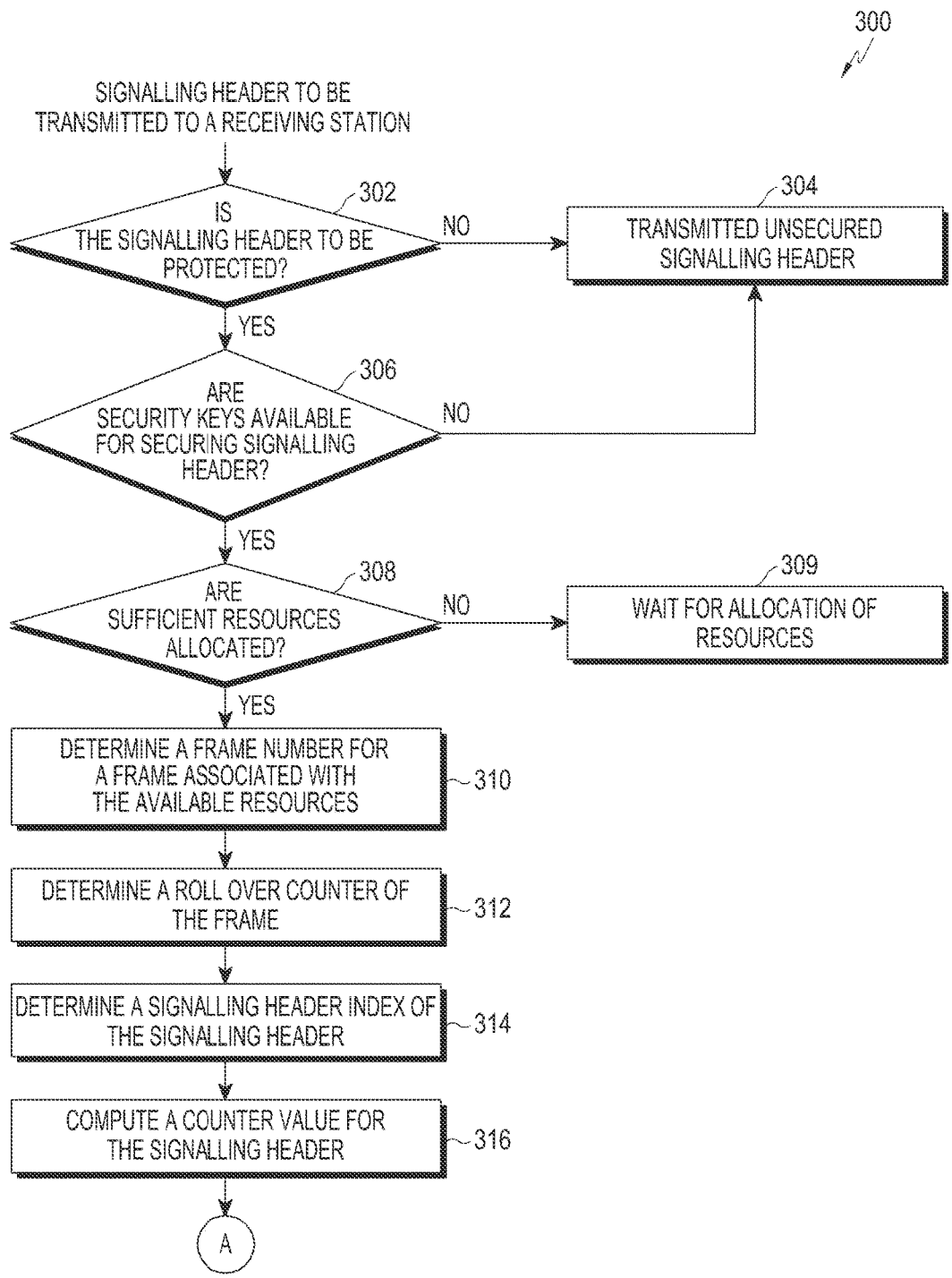

FIGS. 3A and 3B are flowcharts of a detailed method of securing a signaling header according to an embodiment of the present disclosure.

Referring to FIGS. 3A and 3B, consider that the transmitting station 102 has a signaling header to be transmitted to the receiving station 104. A flowchart 300 of a method of securing a signaling header may be used.

At operation 302, it is determined whether the signaling header is to be securely transmitted to the receiving station 104. If the signaling header is to be transmitted in an unprotected manner, then at operation 304, the unsecured signaling header is transmitted to the receiving station 104. If the signaling header is to be securely transmitted, then at operation 306, it is determined whether security keys are available for securing the signaling header. If the security keys are unavailable at operation 306, then the operation 304 is performed.

If the security keys are available at operation 306, then at operation 308, a frame number of a frame associated with the available resources is determined. Alternatively, if the security keys are available at operation 306, then at operation 308, it may be determined whether sufficient resources are available to securely transmit the signaling header. For example, a base station communicates resources allocated to a mobile station for every transmission by the mobile station. Based on the allocated resources, the mobile station may determine whether sufficient resources are available for secured transmission of the signaling header. If there is not sufficient resources available at operation 308, then the operation 309 is performed in which the method waits for an allocation of resources. If sufficient resources are available at operation 306, then the operation 310 is performed.

At operation 310, a frame number for a frame associated with the available resources is determined.

At operation 312, a roll over counter associated with the frame is determined. For example, a roll over counter is incremented after every frame roll over.

At operation 314, a signaling header index (also referred to as control information index) associated with the signaling header is determined. For each frame, each signaling header to be transmitted in each frame is assigned a unique signaling header index. For example, the signaling header index is unique across signaling headers to be transmitted in a frame.

At operation 316, a counter value (previously referred as 'second type of counter') for the signaling header is computed. For example, the counter value for the signaling header is computed based the roll over counter of the frame and the signaling header index. The counter value is used to provide protection against replay attack. A replay attack is a form of network attack in which a valid data transmission is maliciously or fraudulently repeated or delayed.

According to various embodiments of the present disclosure, the counter value constitutes 'n1' most significant bits which correspond to the roll over counter and 'n-n1' least significant bits which correspond to the signaling header index. The 'n1' most significant bits corresponding to the roll over counter are incremented by a value equal to 1 mod $2^{(n1)}$ when a frame roll over occurs. For example, if the frame number comprises 24 bits and 'n1' is 5 bits, then the 'n1' most significant bits of the counter value is incremented by 1 mod 32 when the frame number reaches 0x000000 from 0xFFFFFF. The 'n-n1' least significant bits corresponding to the signaling header index is allocated to signaling headers in such a manner that no two signaling headers in the same frame using the same security keys have the same counter value. This would allow the transmitting station 102 to secure $2^{(n-n1)}$ signaling headers per frame using the same security keys. Thus, the transmitting station 102 would generate new security keys every $2^{(n1+n2)}$ frames, where 'n2' is number of bits representing the frame number.

According to various embodiments of the present disclosure, the counter value constitutes 'n1' least significant bits which correspond to the roll over counter and 'n-n1' most significant bits which correspond to the signaling header index. The 'n1' most significant bits corresponding to the roll over counter are incremented by a value equal to 1 mod $2^{(n1)}$ when a frame roll over occurs. For example, if the frame number comprises 24 bits and 'n1' is 5 bits, then the 'n1' least significant bits of the counter value is incremented by 1 mod 32 when the frame number reaches 0x000000 from 0xFFFFFF. The 'n-n1' most significant bits corresponding to the signaling header index is allocated to signaling headers in such a manner that no two signaling headers in the same frame using the same security keys have the same counter value. Thus, the transmitting station 102 would generate new security keys every $2^{(n1+n2)}$ frames, where 'n2' is number of bits representing the frame number.

According to various embodiments of the present disclosure, the counter value constitutes the roll over counter of the frame. The roll over counter is incremented by a value equal to 1 mod $2^{(n)}$ when a frame roll over occurs. For example, if the frame number comprises 24 bits and 'n' is 5 bits, then the counter value is incremented by 1 mod 32 when the frame number reaches 0x000000 from 0xFFFFFF. This would allow the transmitting station 102 to secure only one signaling header per frame using the same security keys. Thus, the transmitting station 102 would generate new security keys every $2^{(n+n2)}$ frames, where 'n2' is number of bits representing the frame number.

According to various embodiments of the present disclosure, the counter value constitutes the signaling header index associated with the signaling header. The size of the signaling header is computed based on number of signaling headers to be securely transmitted per frame using the same security keys. For example, if the size of the signaling header index is bits, then the transmitting station 102 can secure 2n signaling headers per frame using the same security keys. Thus, the transmitting station 102 would generate new security keys every 2n2 frames, where 'n2' is number of bits representing the frame number.

At operation 318, a flow identifier in a flow identifier field of the signaling header is set. For example, at operation 318, an indication is set in the signaling header to indicate that the signaling header is protected. According to various embodiments of the present disclosure, a flow identifier is set in the flow identifier field of the signaling header to indicate whether the signaling header is protected or not. For example, when the signaling header is protected, the flow identifier is set to a value '0b0100' in the flow identifier field. According to various embodiments of the present disclosure, an EC value is set in the EC field of the signaling header to indicate whether the signaling header is protected or not. For example, the EC field is set to a value '1' if the signaling header is protected. Optionally, a length of the signaling header is set in the length field of the signaling header at operation 318.

At operation 320, a CMAC value (also referred to as 'second type of CMAC') for the signaling header is computed. The CMAC value is generated using a CMAC generation function. The following parameters as provided as input to the CMAC generation function for generating a CMAC value: security key for the second type of control information, an authentication key identifier followed by the frame number followed by the signaling header index followed by the flow identifier followed by the counter value followed by the content of the signaling header. For example, the CMAC value is equal to truncate (security key for second type of control information|authentication key identifier|Frame Number|Mobile station logical address|Flow identifier|Counter Value content of signaling header, 16). According to various embodiments of the present disclosure, 16 least significant bits of the above computed value is used as a CMAC value. According to various embodiments of the present disclosure, other 16 bits of the above computed value is used as a CMAC value.

At operation 322, a secured signaling header is generated by appending the counter value and the CMAC value to the content of the signaling header. According to various embodiments of the present disclosure, the secured signaling header is generated by appending the CMAC value and at least 'n−n1' least significant bits of the counter value to the content of the signaling header when the counter value constitutes 'n1' most significant bits of the roll over counter and 'n−n1' least significant bits of the signaling header index. According to various embodiments of the present disclosure, the secured signaling header is generated by appending the CMAC value and at least 'n1−n1' most significant bits of the counter value when the counter value constitutes 'n1' least significant bits of the roll over counter and 'n−n1' most significant bits of the signaling header index. According to various embodiments of the present disclosure, the secured signaling header is generated by appending the CMAC value and the roll over counter when the counter value is equal to the roll over counter. According to various embodiments of the present disclosure, the secured signaling header is generated by appending the CMAC value and the 'n1' least significant bits of the roll over counter of the frame when the counter value is equal to the roll over counter of the frame. According to various embodiments of the present disclosure, the secured signaling header is generated by appending the CMAC value and/or the signaling header index when the counter value is equal to the signaling header index. For example, the secured signaling header is generated by appending the CMAC value if the number of signaling header allowed to be transmitted per frame is equal to one. It can be noted that, the CMAC value and the counter value are appended to the content of the signaling header such that the total size of the signaling header does not exceed total permissible size (e.g., 7 bytes).

At operation 324, the secured signaling header is transmitted to the receiving station 104.

The following description explains process of protecting a signaling header in an (IEEE) 802.16.1b system. Consider that, a mobile station in the IEEE 802.16.1b has to securely transmit a signaling header to a base station. Also consider that, security keys CMAC_SIG_KEY_U and CMAC_SIG_KEY_D for authenticating the signaling header in uplink and downlink respectively are derived as follows:

CMAC_SIG_KEY_U|CMAC_SIG_KEY_D=Dot16 KDF (CMAC-TEK prekey, "CMACSIG", 256).

Upon obtaining the security keys, the mobile station resets the counter value to zero. The counter value is 8 bits in size. The first 5 bits of the counter value represents a roll over counter for a frame in which the signaling header is to be transmitted. The next 3 least significant bits of the counter value represents a signaling header index allocated to the signaling header. It can be noted that, a signaling header index is allocated to a signaling header in such a manner that no two signaling headers in the same frame are secured using the same security keys have the same counter value. This allows the mobile station to protect 8 signaling headers per frame of 5 millisecond duration using the same security keys. Because the frame number is 24 bits in size and the roll over counter is 5 bits in size, the mobile station increments the counter value by a value '1 mod 32' when the frame number reaches 0x000000 from 0xFFFFFF. Further, new security keys are required to be derived after every $2^{24}*2^5=2^{29}$ frames.

Then, the mobile station computes a CMAC value over a field including of authentication key IDidentifier (AKID) followed by a 24 bit frame number followed by a 12 bit Station IDentifier (STID) and a 4 bit Flow IDentifier (FID) of the signaling header followed by the 8 bit counter value followed by 16 bit zero padding followed by the content of the signaling header. The frame number is computed based on 22 bit super frame number and 2 bit frame index. For example, the CMAC value for the signaling header is calculated as follows:

CMAC value=Truncate (CMAC (CMAC_SIG_KEY, AKID|22 bit super frame number|2 bit frame index|STID-|FID|counter value|16 bit zero padding|signaling header content), 16). It is appreciated that the CMAC value is constructed as specified in NIST special publication 800-38B. The mobile station generates a secured signaling header using LSB 16 bits of the outcome AES-CMAC calculation as CMAC value and 3 LSBs of the counter value.

A process of protecting an abnormal power down signaling header in the IEEE 802.16.1b system is explained in the following description. Consider that, a Machine to Machine (M2M) device in the IEEE 802.16.1b has to securely transmit an abnormal power down signaling header in an uplink direction. Also consider that, security key CMAC_SIG_KEY_U for authenticating the abnormal power down signaling header transmitted by the M2M device in uplink direction are derived as follows:

CMAC_SIG_KEY_U=Dot16KDF(CMAC-TEK prekey,"CMACSIG",128).

Upon obtaining the security keys, the mobile station resets the counter value to zero. The counter value is equal to a roll over counter for a frame and is 8 bits in size. The M2M device increments the counter value by a value '1 mod 8' when the frame number reaches 0x000000 from 0xFFFFFF. Thus, the M2M device can securely transmit one abnormal power down signaling header per frame using the same uplink security key. Further, new security keys are required to be derived after every $2^{24}*2^{8}=2^{32}$ frames.

Then, the mobile station computes a CMAC value over a field including AKID followed by 24 bit frame number followed by a 12 bit STID and 4 bit FID of the signaling header followed by 8 bit counter value followed by 16 bit zero padding followed by the content of the abnormal power down signaling header. The frame number is computed based on 22 bit super frame number and 2 bit frame index. For example, the CMAC value for the abnormal power down signaling header is calculated as follows:

CMAC value=Truncate (CMAC (CMAC_SIG_KID_U, AKID|22 bit super frame number|2 bit frame index|STID-|FID|counter value|16 bit zero padding|signaling header content), 16). It is appreciated that the CMAC value is constructed as specified in NIST special publication 800-38B. The mobile station generates a secured abnormal power down signaling header using LSB 16 bits of the outcome AES-CMAC calculation as CMAC value and 3 LSBs of the counter value.

FIG. 4A illustrates a format of a protected MAC signaling header according to an embodiment of the present disclosure.

Referring to FIG. 4A, the MAC signaling header 400 includes a FID field 402, a type field 404, a length field 406, a content field 408, a counter field 410, and a CMAC value field 412.

The FID field 402 includes a flow identifier associated with the MAC signaling header 400 indicating whether the MAC signaling header is protected. For example, if the MAC signaling header 400 is protected, the FID field 402 includes a value '0b100'. If the MAC signaling header 400 is not protected, then the FID field 402 includes a value '0b0010'. Thus, based on the value set in the FID field 402, the receiving station 104 determines whether the MAC signaling header 400 is protected or unprotected. The FID field 402 is 4 bits in size. The type field 404 indicates type of the MAC signaling header 400 and is 5 bits in size. The length field 406 indicates length of the FID field 402, the type field 404, and the content field 406. The length field 406 is 4 bits in size. For example, if the size of the MAC signaling header is 2 bytes, the length field 406 is set to a value '0b010'.

The content field 408 includes content of the MAC signaling header 400 and is up to 36 bits size. The counter field 410 includes a counter value computed for the MAC signaling header 400 and is 8 bits in size. The CMAC field 412 includes a CMAC value computed for the MAC signaling header 400 and is 16 bits in size. It is understood that, the MAC signaling header 400 may not include the counter field 410 and the CMAC field 412 if the FID field 402 is set to a value '0b0010' (e.g., when the MAC signaling header is unprotected).

FIG. 4B illustrates a format of a protected MAC signaling header according to an embodiment of the present disclosure.

Referring to FIG. 4B, it can be seen that, the MAC signaling header 450 is similar to the MAC signaling header 400 of FIG. 4A, except the information carried in the length field 406. In the MAC signaling header 450, the length field 406 indicates sum of lengths of the FID field 402, the type field 404, the content field 408, the counter field 410, and the CMAC field 412.

Figure 5A:
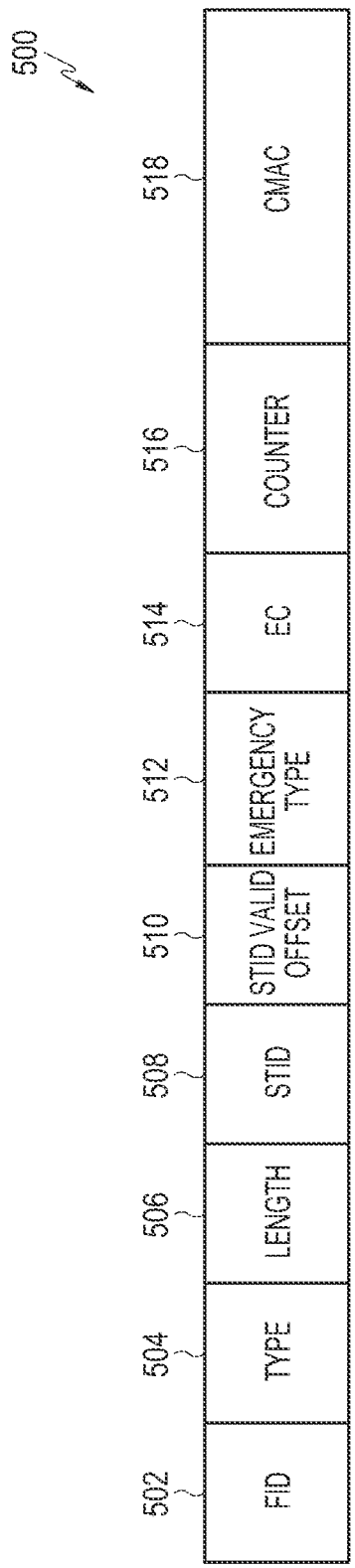
FIG. 5A illustrates a format of a protected abnormal power down signaling header according to an embodiment of the present disclosure.

FIG. 5A illustrates a format of a protected abnormal power down signaling header according to an embodiment of the present disclosure.

Referring to FIG. 5A, the abnormal power down signaling header 500 includes a FID field 502, a type field 504, a length field 506, an STID field 508, an STID valid offset 510, an emergency type field 512, an EC field 514, a counter field 516, and a CMAC field 518.

The FID field 502 includes a flow identifier which distinguishes a MAC signaling header from other MAC PDUs. The FID field 402 is 4 bits in size. The type field 504 indicates type of the abnormal power down signaling header 500 and is 5 bits in size. The length field 506 indicates total length of the abnormal power down signaling header 500. The length field 506 is 4 bits in size. The STID field 508 includes an STID associated with a mobile station transmitting the abnormal power down signaling header 500. The STID field 510 indicates an STID valid offset assigned to the mobile station when the same STID is assigned to more than one mobile station. If the STID is uniquely assigned to a single mobile station, the mobile station sets the STID valid offset field 510 to a value '0'. The size of the STID valid offset field 510 is 3 bits.

The emergency type field 512 indicates type of emergency for which with the abnormal power down signaling header is transmitted. The size of the emergency field 512 is 1 bit. For example, the emergency type field 512 is set to a value '0b0' if the emergency type is power outage. The EC field 514 indicates whether the abnormal power down signaling header 500 is protected and is of size 1 bit. For example, if the abnormal power down signaling header 500 is protected, the EC field 514 includes a value '1'. If the abnormal power down signaling header 500 is not protected, then the EC field 514 includes a value '0'. Thus, based on the value set in the EC field 514, the receiving station 104 determines whether the abnormal power down signaling header 500 is protected or unprotected.

The counter field 516 includes a counter value computed for the abnormal power down signaling header 500. The size of the counter field 516 is 3 bits. The CMAC field 518 includes a CMAC value computed for the abnormal power down signaling header 500 and is 16 bits in size. It is understood that, the abnormal power down signaling header 500 may not include the counter field 516 and the CMAC field 518 and includes a reserved field of size 19 bits or 3 bits when the abnormal power down signaling header is unprotected.

Figure 5B:
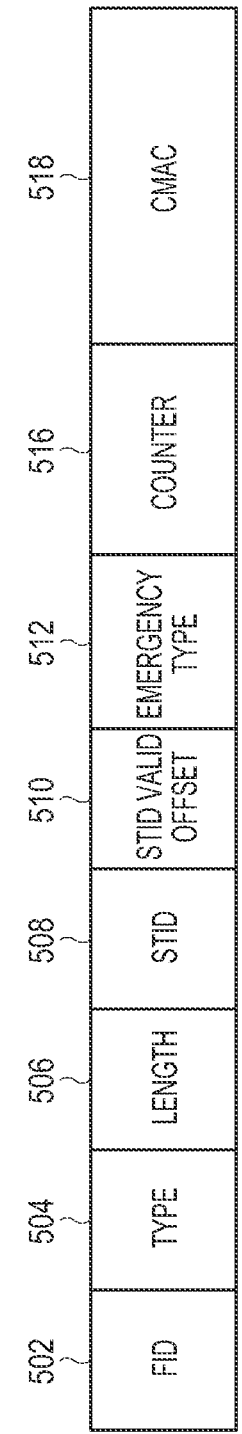
FIG. 5B illustrates a format of a protected abnormal power down signaling header according to an embodiment of the present disclosure.

FIG. 5B illustrates a format of a protected abnormal power down signaling header according to an embodiment of the present disclosure.

Referring to FIG. 5B, it can be seen that, the abnormal power down signaling header 550 of FIG. 5B is the same as the abnormal power down signaling header 500 of FIG. 5A, except that the abnormal power down signaling header 550 does not include the EC field 514. In the abnormal power down signaling header 550, the FID field 502 is set to indicate whether the abnormal power down signaling header 550 is protected or not. For example, if the abnormal power down signaling header 550 is protected, the FID field is set to a value '0b0100'.

FIG. 5C illustrates a format of a protected abnormal power down signaling header according to an embodiment of the present disclosure.

Referring to FIG. 5C, the abnormal power down signaling header 560 according to the IEEE 802.16p system is illustrated. The abnormal power down signaling header 560 includes an HT field 561, an EC field 562, a type field 563, an extended type field 564, a CID field 565, an emergency type field 566, a CMAC indicator field 567, a CMAC value field 568, a counter field 569, a reserved field 570, and a header check sequence field 571.

The CMAC indicator field 567 indicates whether the abnormal power down signaling header 560 is protected or not. For example, the CMAC indicator field 567 is set to a value '1' if the abnormal power down signaling header is protected. Alternatively, when the abnormal power down signaling header 568 is not protected, the CMAC indicator is set to a value '0'. The CMAC field 568 includes a CMAC value computed for the abnormal power down signaling header 560 and is 16 bits in size. The counter field 569 includes a counter value computed for the abnormal power down signaling header 560. The size of the counter field 569 is 2 bits. It is understood that, the abnormal power down signaling header 560 does not include the CMAC field 568 and the counter field 569 when the CMAC indicator field 567 is set to a value '0'. In addition, when the CMAC indicator field 567 is set to a value '0', the reserved field 571 of size 18 bits is included in the abnormal power down signaling header 560. Because the other fields 561 to 566 and 571 are well the known to the person skilled in the art, the explanation is thereof omitted.

FIG. 5D illustrates a format of a protected abnormal power down signaling header according to an embodiment of the present disclosure.

Referring to FIG. 5D, it can be seen that, the abnormal power down signaling header 575 of FIG. 5D is the same as the abnormal power down signaling header 560 of FIG. 5C, except the abnormal power down signaling header 575 does not include the extended type field 564. In the abnormal power down signaling header 575, the type field 563 is used to indicate a type as M2M abnormal power down signaling header 575. It can be noted that, the elimination of the extended type field 564 would enable the transmitting station 102 to include 3 LSBs of the counter value in the abnormal power down signaling header 575 as opposed to 2 LSBs in the abnormal power down signaling header 560.

Figure 5E:
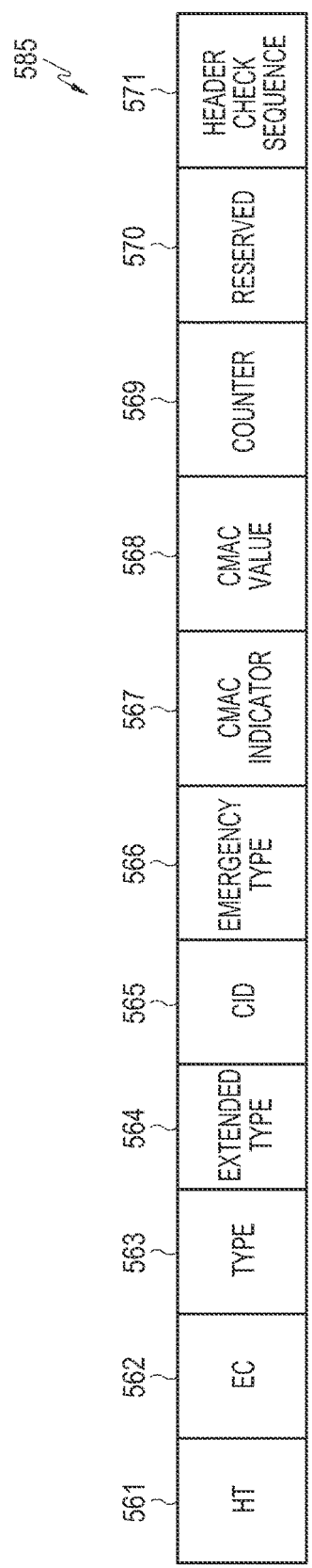
FIG. 5E illustrates a format of a protected abnormal power down signaling header according to an embodiment of the present disclosure.

FIG. 5E illustrates a format of a protected abnormal power down signaling header according to an embodiment of the present disclosure.

Referring to FIG. 5E, it can be seen that, the abnormal power down signaling header 585 of FIG. 5E is the same as the abnormal power down signaling header 560 of FIG. 5C, except the abnormal power down signaling header 585 does not include the counter field 569.

It can be seen from FIGS. 5A to 5E, the fields are added to the abnormal power down signaling header in such a way that total size of the abnormal power down signaling header does not exceed six bytes. This facilitates the transmitting station 102 (e.g., a M2M device) to securely transmit the abnormal signaling header instead of a bandwidth request signaling header in the allocated resources (of 6 bytes) based on a bandwidth request procedure.

Figure 6:
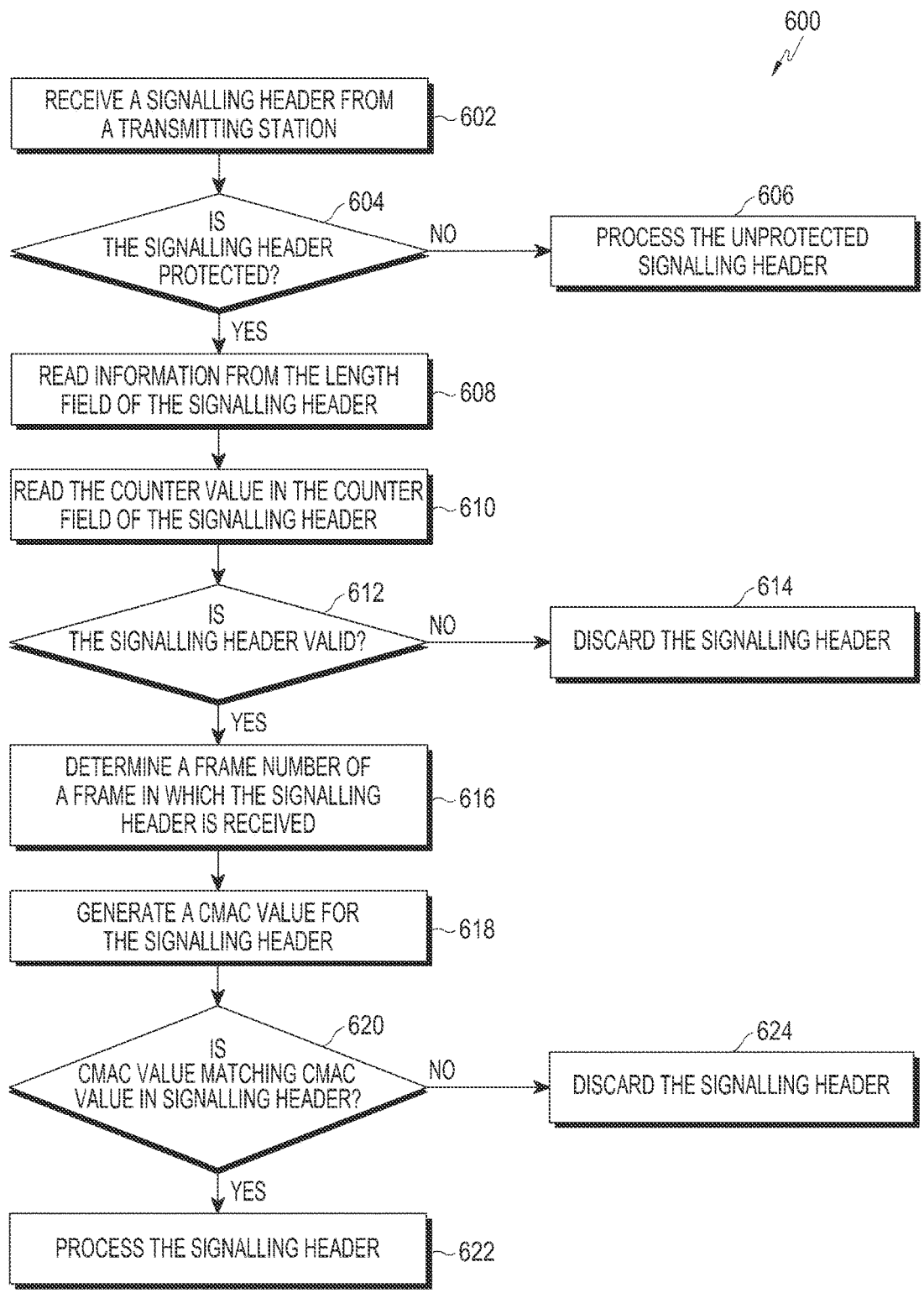
FIG. 6 is a flowchart illustrating a method of processing a signaling header received from a transmitting station according to an embodiment of the present disclosure.

FIG. 6 is a flowchart 600 illustrating a method of processing the signaling header received from a transmitting station according to an embodiment of the present disclosure.

Referring to FIG. 6, at operation 602, a signaling header is received from the transmitting station 102.

At operation 604, it is determined whether the signaling header is protected or not based on the indicator set in the signaling header. For example, if the flow identifier field of the signaling header is used to indicate that the signaling header is protected, then it is determined whether the signaling header is protected or not based on the value set in the flow identifier field. Alternatively, if the EC field of the signaling header is used to indicate that the signaling header is protected, then it is determined whether the signaling header is protected or not based on the value set in the EC field.

If the indicator indicates that the signaling header is not protected at operation 604, then at operation 606, the signaling header is directly processed.

If the indicator indicates that the signaling header is protected at operation 604, then at operation 608, information in the length field of the signaling header is read. It can be noted that, the receiving station 104 reads the length field if the signaling header is a variable length signaling header.

At operation 610, the counter value in the counter field of the signaling header is read.

At operation 612, it is determined whether the signaling header is valid based on the counter value. In other words, at operation 612, it is determined whether any signaling header with same counter value is received previously.

If the signaling header is not valid at operation 612, then the signaling header is discarded at operation 614.

If the signaling header is valid at operation 612, then at operation 616, a frame number of a frame in which the signaling header is received is determined. Each frame is assigned a frame number. When a MAC PDU including the signaling header is received from the transmitting station 102, the receiving station 104 determines the frame in which the signaling header is transmitted and then determines a frame number associated with the frame.

At operation 618, a CMAC value for the signaling header is generated. For example, the CMAC value for the signaling header may be generated based on the frame number and the counter value.

At operation 620, it is determined whether the generated CMAC value matches with the CMAC value in the CMAC field of the received signaling header. If the determination is true (e.g., if the generated CMAC values matches the CMAC value in the field), then at operation 622, the signaling header is processed. Otherwise, at operation 624, the signaling header is discarded.

Figure 7A:
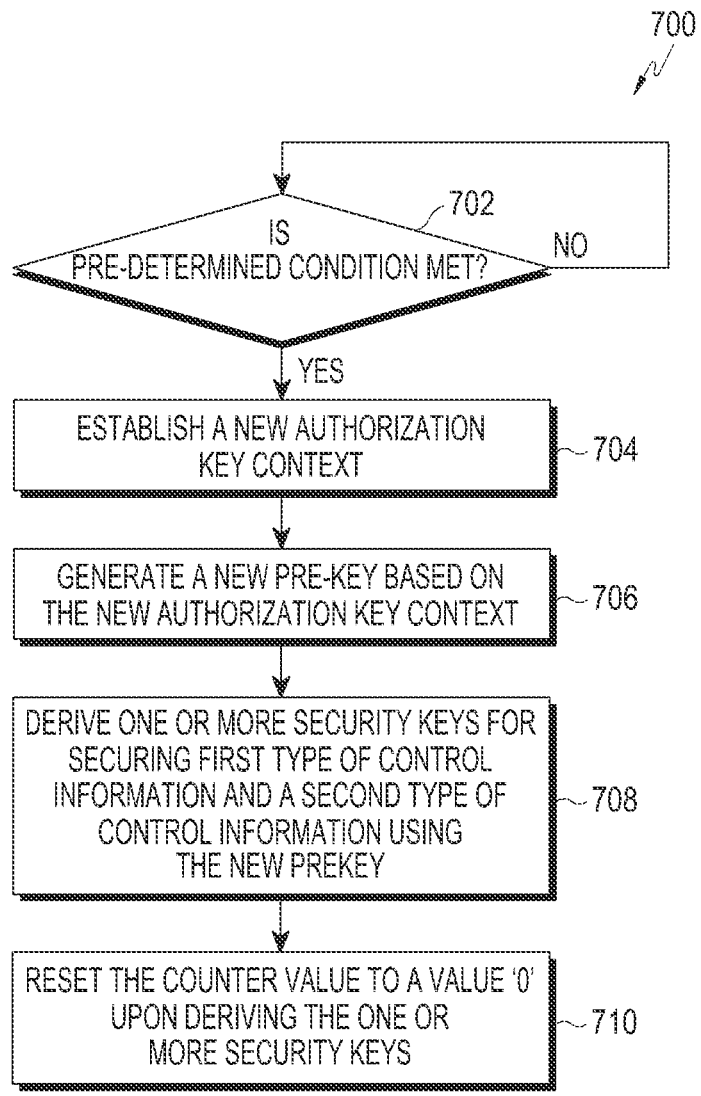
FIG. 7A is a flowchart illustrating a method of refreshing security keys associated with a first type of control information and a second type of control information according to an embodiment of the present disclosure.

FIG. 7A is a flowchart 700 illustrating a method of refreshing security keys associated with a first type of control information and a second type of control information according to an embodiment of the present disclosure.

Referring to FIG. 7A, at operation 702, it is determined whether a predetermined condition is met for refreshing the security keys derived for the first type of information and the second type of information. According to various embodiments of the present disclosure, the pre-determined condition is said to have met when 'n1' bits of the counter value corresponding to the roll over counter of the frame concatenated with the frame number reaches a threshold value. According to such embodiments of the present disclosure, the threshold value may be equal to $2^{(n1+n2)}$ frames, where 'n2' is number of bits representing a frame number. According to various embodiments of the present disclosure, the pre-determined condition is said to have met when the roll over counter of the frame concatenated with the frame number reaches a threshold value. According to such embodiments of the present disclosure, the threshold value may be equal to $2^{n+n2)}$ frames, where 'n' represents the roll over counter of the frame and 'n2' is number of bits representing the frame number. According to various embodiments of the present disclosure, the pre-determined condition is said to have met when the frame number reaches a threshold value. According to such embodiments of the present disclosure, the threshold value may be equal to $2^{n2}$ frames, where 'n2' is number of bits representing the frame number.

If it is determined that the pre-determined condition is met at operation 702, then at operation 704, a new authorization key context is established between the transmitting station 102 and the receiving station 104.

At operation 706, a new pre-key is generated based on the new authorization key context.

At operation 708, one or more new security keys are derived for securing the first type of control information and the second type of control information using the pre-key.

At operation 710, the counter value is set to a value '0' upon deriving new security keys and is incremented by a value '1' after every frame roll over.

Figure 7B:
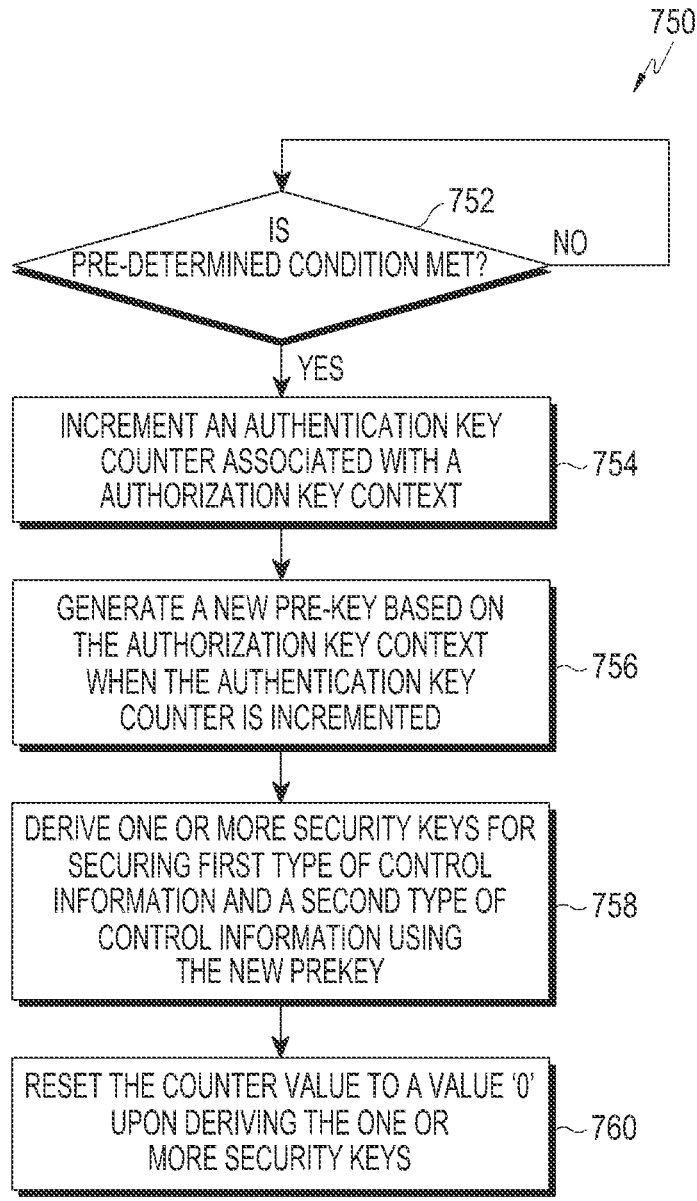
FIG. 7B is a flowchart illustrating a method of refreshing security keys associated with a first type of control information and a second type of control information according to an embodiment of the present disclosure.

FIG. 7B is a flowchart 750 illustrating a method of refreshing security keys associated with a first type of control information and a second type of control information according to an embodiment of the present disclosure.

Referring to FIG. 7B, at operation 752, it is determined whether the predetermined condition is met for refreshing the security keys derived for the first type of information and the second type of information.

If it is determined that the pre-determined condition is net at operation 752, then at operation 754, an authentication key counter value associated with the authentication key context is incremented by a value '1'. The transmitting station maintains an authentication key counter to track whether the pre-determined condition is met. This would eliminate need to perform operation 702 of FIG. 7A.

At 756, a new pre-key is generated from the new authorization key context when the authentication key counter value associated with the authentication key is incremented.

At operation 758, one or more new security keys are derived for securing the first type of control information and the second type of control information using the new pre-key.

At operation 760, the counter value is set to a value '0' upon deriving new security keys and is incremented by a value '1' after every frame roll over.

Figure 7C:
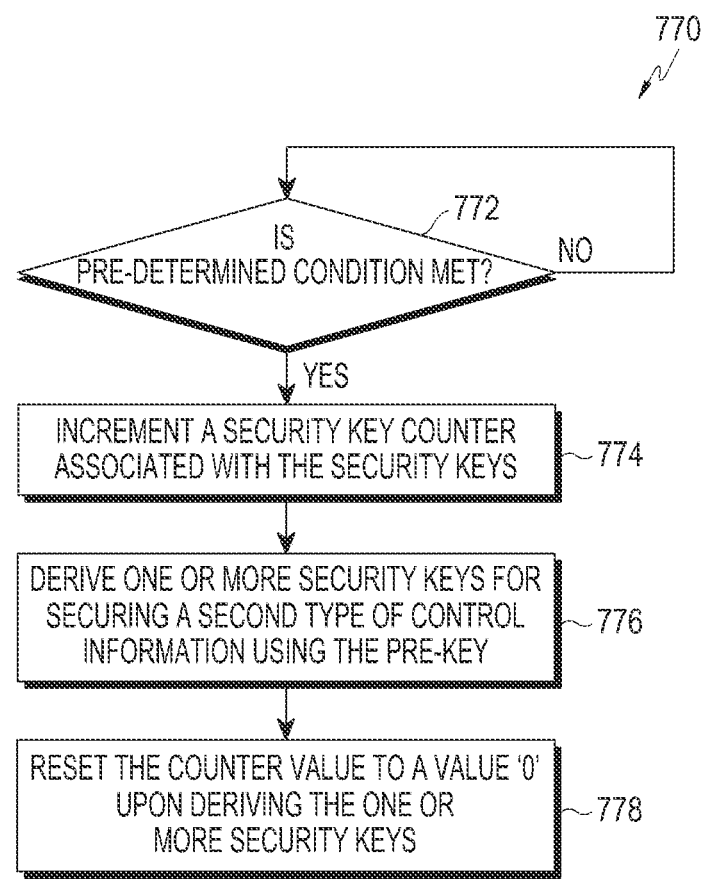
FIG. 7C is a flowchart illustrating a method of refreshing security keys associated with a first type of control information and a second type of control information according to an embodiment of the present disclosure.

FIG. 7C is a flowchart 770 illustrating a method of refreshing security keys associated with a first type of control information and a second type of control information according to an embodiment of the present disclosure.

Referring to FIG. 7C, at operation 772, it is determined whether the predetermined condition is met for refreshing the security keys derived for the second type of information (e.g., signaling headers).

If it is determined that the pre-determined condition is met at operation 772, then at operation 774, a security key counter associated with the security keys derived for the second type of control information is incremented by a value '1'. The transmitting station 102 maintains a security key counter to track whether the pre-determined condition is met. This would eliminate need to perform operations 702 and 704 of FIG. 7A.

At operation 776, one or more new security keys are derived for securing the second type of control information using the existing pre-key when the security key counter value associated with the one or more security keys is incremented by a value '1'. Thus, the transmitting station 102 need not derive new security keys for both type of control information when the security key counter for second type of control information is incremented by '1'. One skilled in the art can envision that the transmitting station 102 can maintain a separate security key counter for the first type of control information and derives new security keys from the pre-key for securing the first type of control information when the security key counter is incremented.

At operation 778, the counter value is set to a value '0' upon deriving new security keys and is incremented by a value '1' after every frame roll over.

Figure 8:
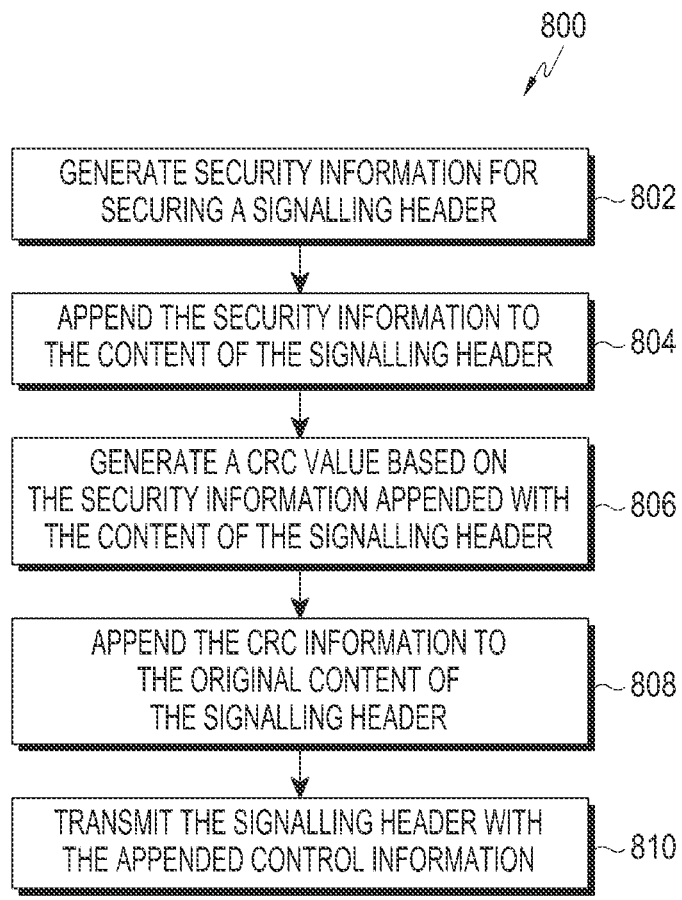
FIG. 8 is a flowchart of a detailed method of securing a signaling header according to an embodiment of the present disclosure.

FIG. 8 is a flowchart 800 of a detailed method of securing a signaling header, according to an embodiment of the present disclosure.

Referring to FIG. 8, at operation 802, security information is generated for securing a signaling header to be transmitted to the receiving station 102. The security information is generated as follows:

Security information=Security key ID=Dot16KDF (Security Key, Security Key Count|Mobile station identifier|Base station identifier|Frame number|zero padding (optional)|security key ID, n). According to various embodiments of the present disclosure, the value of 'n' is 64 bits. The security key count is updated every frame roll over and security key is refreshed before the security key count reaches its maximum value.

At operation 804, the security information is appended to content of the signaling header.

At operation 806, a Cyclic Redundancy Check (CRC) value is generated based on the security information and the content of the signaling header. The process of generating CRC value is well known in the art and explanation is thereof omitted.

At operation 808, the CRC information is appended to the original content of the signaling header. The FID field or the EC field of the signaling header may be used to indicate whether the signaling header is protected.

At operation 810, the signaling header with the CRC information is transmitted to the receiving station 104.

Figure 9:
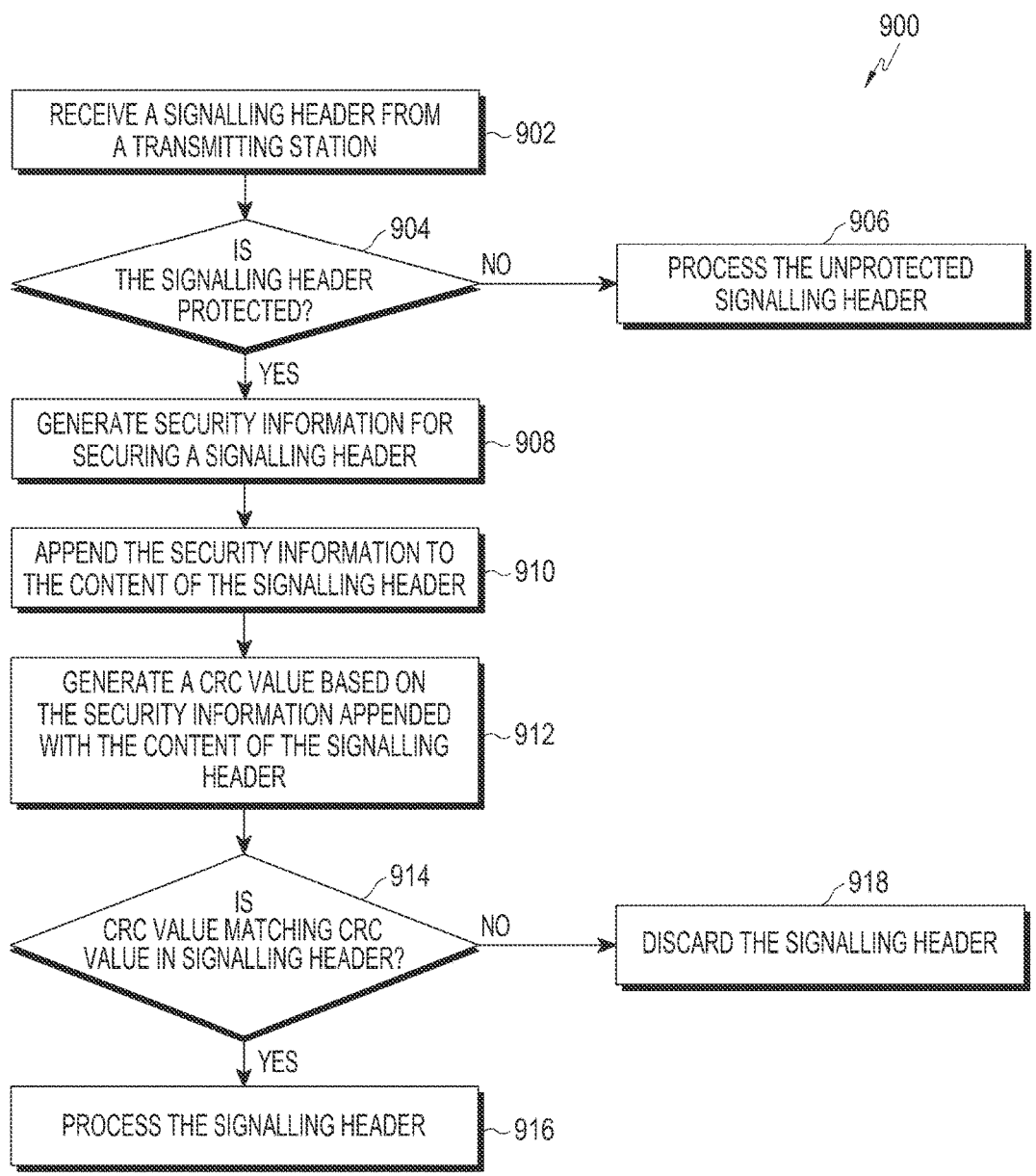
FIG. 9 is a flowchart of a detailed method of processing a protected signaling header received from a transmitting station according to an embodiment of the present disclosure.

FIG. 9 is a flowchart 900 of a detailed method of processing a protected signaling header received from a transmitting station, according to an embodiment of the present disclosure.

Referring to FIG. 9, at operation 902, a signaling header is received from the transmitting station 102.

At operation 904, it is determined whether the signaling header is protected or not based on the flow identifier/EC field in the signaling header.

If the flow identifier/EC field indicates that the signaling header is not protected at operation 904, then at operation 906, signaling header is directly processed.

If the flow identifier indicates that the signaling header is protected at operation 904, then at operation 908, the security information is generated.

At operation 910, the security information is appended to the content of the signaling header.

At operation 912, a CRC value is generated using the security information appended with the content of the signaling header.

At operation 914, it is determined whether the generated CRC matches with the CRC value in the protected signaling header. If the generated CRC is determined to match the CRC value in the protected signaling header at operation 914, then at operation 916, the content of the protected signaling header is processed. However, if the generated CRC is determined not to match the CRC value in the protected signaling header at operation 914, the signaling header is discarded at operation 918.

Figure 10:
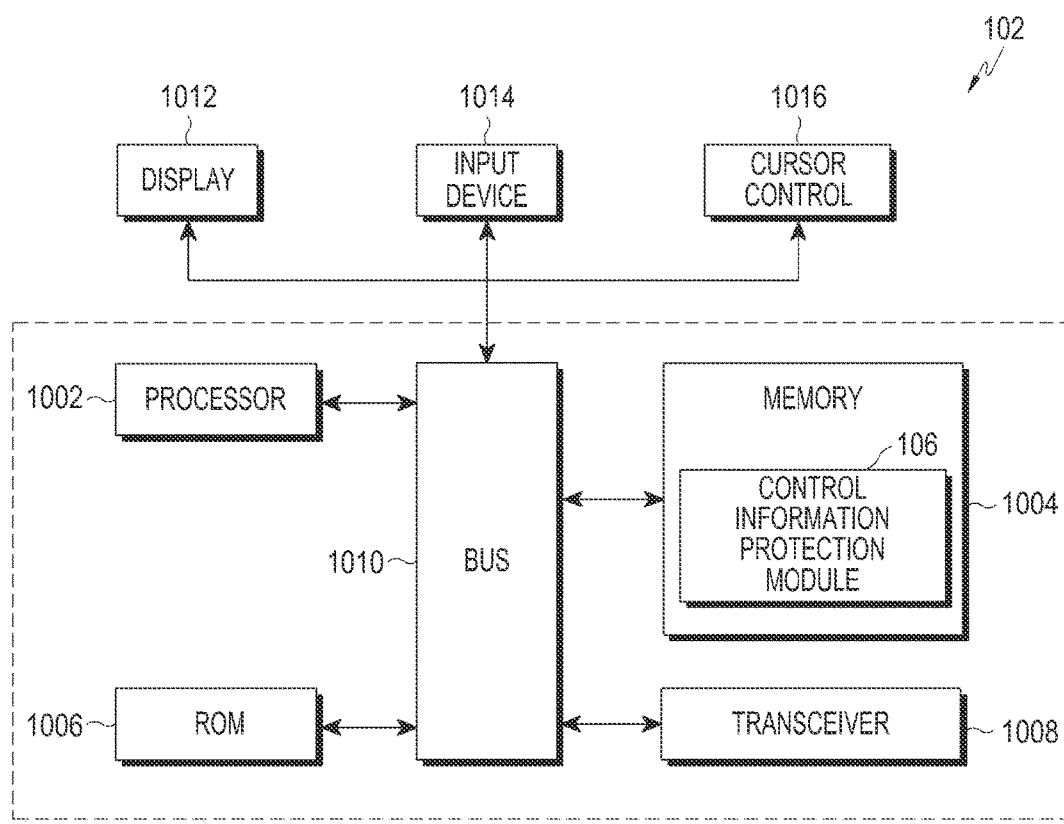
FIG. 10 is a block diagram of a transmitting station showing various components according to an embodiment of the present disclosure.

FIG. 10 is a block diagram of a transmitting station showing various components according to an embodiment of the present disclosure.

Referring to FIG. 10, the transmitting station 102 includes a processor 1002, a memory 1004, a Read Only Memory (ROM) 1006, a transmitter 1008, a bus 1010, a display 1012, an input device 1014, and a cursor control 1016.

The processor 1002, as used herein, may correspond to any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, any other type of processing circuit, and/or the like. The processor 1002 may also include embedded controllers, such as generic or programmable logic devices or arrays, application specific integrated circuits, single-chip computers, smart cards, and/or the like.

The memory 1004 and the ROM 1006 may be volatile memory and non-volatile memory. The memory 1004 includes the control information protection module 106 for securing a first type of control information and a second type of control information, according to one or more embodiments described above. A variety of non-transitory computer-readable storage media may be stored in and accessed from the memory elements. Memory elements may include any suitable memory device(s) for storing data and machine-readable (e.g., computer-readable) instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and/or the like.

Various embodiments of the present disclosure may be implemented in conjunction with modules, including functions, procedures, data structures, and application programs, for performing tasks, or defining abstract data types or low-level hardware contexts. The control information protection module 106 may be stored in the form of machine-readable (e.g., computer-readable) instructions on any of the above-mentioned storage media and may be executable by the processor 1002. For example, a computer program may include machine-readable (e.g., computer-readable) instructions capable of securing a first type of control information and a second type of control information, according to the teachings and herein described embodiments of the present disclosure. According to various embodiments of the present disclosure, the program may be included on a compact disk-read only memory (CD-ROM) and loaded from the CD-ROM to a hard drive in the non-volatile memory.

The transceiver 1008 may be capable of securely transmitting the first type of control information and the second type of control information to the receiving station 104. The bus 1010 acts as interconnect between various components of the transmitting station 102. The components such as the display 1012, the input device 1014, and the cursor control 1016 are well known to the person skilled in the art and hence the explanation is thereof omitted.

Figure 11:
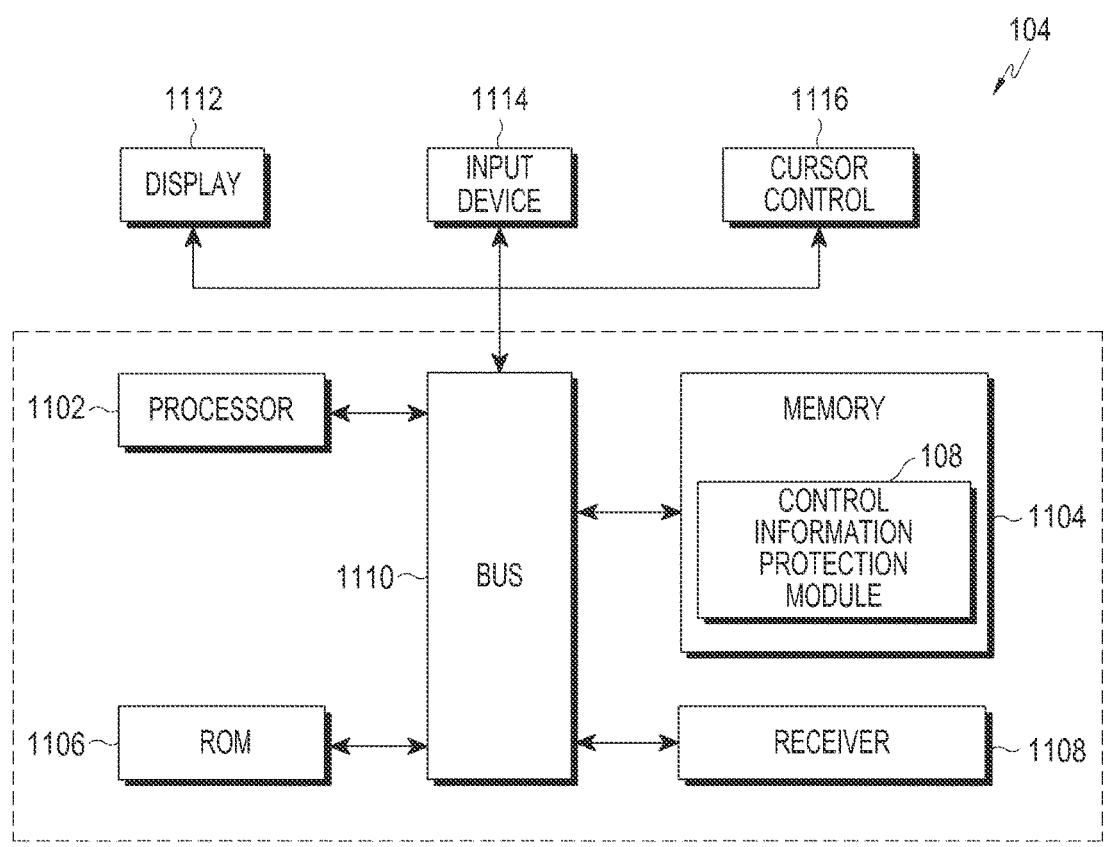
FIG. 11 is a block diagram of a receiving station showing various components according to an embodiment of the present disclosure.

FIG. 11 is a block diagram of a receiving station showing various components according to an embodiment of the present disclosure.

Referring to FIG. 11, the receiving station 104 includes a processor 1102, memory 1104, a Read Only Memory (ROM) 1106, a receiver 1108, a bus 1110, a display 1112, an input device 1114, and a cursor control 1116.

The processor 1102, as used herein, may correspond to any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, any other type of processing circuit, and/or the like. The processor 1102 may also include embedded controllers, such as generic or programmable logic devices or arrays, application specific integrated circuits, single-chip computers, smart cards, and/or the like.

The memory 1104 and the ROM 1106 may be volatile memory and non-volatile memory. The memory 1104 includes the control information processing module 108 for processing the first type of control information and the second type of control information, according to one or more embodiments described above. A variety of non-transitory computer-readable storage media may be stored in and accessed from the memory elements. Memory elements may include any suitable memory device(s) for storing data and machine-readable (e.g., computer-readable) instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and/or the like.

Various embodiments of the present disclosure may be implemented in conjunction with modules, including functions, procedures, data structures, and application programs, for performing tasks, or defining abstract data types or low-level hardware contexts. The control information processing module 108 may be stored in the form of machine-readable (e.g., computer-readable) instructions on any of the above-mentioned storage media and may be executable by the processor 1102. For example, a computer program may include machine-readable (e.g., computer-readable) instructions capable of processing the secured first type of control information and the secured second type of control information, according to the teachings and herein described embodiments of the present disclosure. According to various embodiments of the present disclosure, the computer program may be included on a Compact Disk-Read Only Memory (CD-ROM) and loaded from the CD-ROM to a hard drive in the non-volatile memory.

The receiver 1108 may be capable of securely receiving the first type of control information and the second type of control information from the transmitting station 102. The bus 1110 acts as interconnect between various components of the receiving station 104. The components such as the display 1112, the input device 1114, and the cursor control 1116 are well known to the person skilled in the art and hence the explanation is thereof omitted.

Although, the above described embodiments are described with reference to IEEE802.16 system and in particular to IEEE802.16.1 system, one skilled in the art can understand that the reference to IEEE802.16.1 systems is purely exemplary and that various embodiments of the present disclosure are applicable to other cellular communications without the loss of generality.

The various embodiments of the present disclosure have been described with reference to specific example embodiments; it will be evident that various modifications and changes may be made to such embodiments without departing from the broader spirit and scope of the various embodiments of the present disclosure. Furthermore, the various devices, modules, and the like described herein may be enabled and operated using hardware circuitry, for example, complementary metal oxide semiconductor based logic circuitry, firmware, software and/or any combination of hardware, firmware, and/or software embodied in a non-transitory machine-readable medium (e.g., a non-transitory computer-readable storage medium). For example, the various electrical structure and methods may be embodied using transistors, logic gates, and electrical circuits, such as application specific integrated circuit.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method for transmitting control information in a wireless communication system, the method comprising:
generating, at a machine to machine (M2M) device, an authentication key for authenticating the control information based on an authentication code; and
transmitting, at the M2M device, the control information protected based on the authentication key, the control information comprising an indicator indicating whether the control information is protected using the authentication code,
wherein the indicator indicates one of values comprising a first value indicating that the control information is protected using the authentication code and a second value indicating that the control information is not protected using the authentication code, and
wherein the authentication key is generated using a predetermined function based on a TEK prekey and a CMACSIG.

2. The method of claim 1, wherein the protected control information is recorded in an abnormal power down signaling header.

3. The method of claim 1, further comprising:
if a number of frames in which the protected control information is recorded reaches a preset range, increasing a counter for the number of frames; and
if a new authentication key is generated every predefined number of frames, resetting the counter.

4. The method of claim 1, further comprising:
generating a new authentication key every predefined number of frames.

5. The method of claim 1, wherein if the indicator indicates that the control information is protected using the authentication code, the control information further comprises at least one of information indicating a counter for a number of frames in which the protected control information is transmitted, or information indicating the authentication code.

6. The method of claim 1, wherein the authentication key (CMAC SIG KEY U) is generated using the predetermined function (Dot16KDF) based on the TEK prekey (CMAC-TEK prekey, encryption key), the CMACSIG (predefined constant) for the authentication key, and a length of input bit strings (128), by the following equation:

CMAC SIG KEY U=Dot16KDF(CMAC-TEK prekey,CMACSIG,128).

7. The method of claim 1, wherein the authentication code (CMAC value) is generated using a predetermined function (Truncate), the authentication key (CMAC_SIG_KEY_U), an authorization key (AK) identifier (AKID), a flow identifier (FID), a station ID (STID) of the M2M device, a counter value for a number of frame in which the protected control information is transmitted, and 16 is the least significant 16 bits of an outcome of advanced encryption standard cipher based message authentication code (CMAC) calculation to be used for the authentication code, by the following equation:

CMAC value=Truncate(CMAC(CMAC_SIG_KEY_U,AKID|22 bits super frame number|2 bits frame index|STID|FID|counter value|16 bits zero padding|abnormal power down signaling header content),16).

8. The method of claim 1, wherein the control information further comprises at least one of:
a first value indicating a flow identifier (FID) set to 0b0010,
a station ID (STID) of the M2M device,
a second value indicating a length of the control information,
a third value indicating an STID valid offset set to zero if the STID is assigned to only the M2M device, or
a fourth value indicating an emergency type that is set to '0b1' if the emergency type is power outage.

9. A method for receiving control information in a wireless communication system, the method comprising:
receiving, from a machine to machine (M2M) device, the control information protected based on an authentication code, the control information comprising an indicator indicating whether the control information is protected using the authentication code; and
authenticating the control information using an authentication key generated based on values obtained from the control information,
wherein the indicator indicates one of values comprising a first value indicating that the control information is protected using the authentication code and a second value indicating that the control information is not protected using the authentication code, and
wherein the authentication key is generated using a predetermined function based on a TEK prekey and a CMACSIG.

10. The method of claim 9, wherein the protected control information is recorded in an abnormal power down signaling header.

11. The method of claim 9,
wherein if a number of frames in which the protected control information reaches a preset range, a counter for the number of frames is increased, and
wherein, if a new authentication key is generated every predefined number of frames, the counter is reset.

12. The method of claim 9, wherein a new authentication key is generated every predefined number of frames.

13. The method of claim 9, wherein if the indicator indicates that the control information is protected using the authentication code, the values comprises at least one of:
information indicating a counter for a number of frames in which the protected control information is transmitted, or
information indicating the authentication code.

14. The method of claim 9, wherein the authentication key (CMAC SIG KEY U) is generated using the predetermined function (Dot16KDF) based on the TEK prekey (CMAC-TEK prekey, encryption key), the (CMACSIG (predefined constant) for the authentication key, and a length of input bit strings (128), by the following equation:

CMAC_SIG_KEY_U=Dot16KDF(CMAC-TEK prekey,CMACSIG,128).

15. The method of claim 9, wherein the authentication code is generated using a predetermined function (Truncate), the authentication key (CMAC_SIG_KEY_U), an authorization key (AK) identifier (AKID), a flow identifier (FID), a station ID (STID) of the M2M device, a counter value for a number of frame in which the protected control information is transmitted, and 16 is LSB (least significant bit) 16 bits of an outcome of advanced encryption standard cipher based message authentication code (CMAC) calculation to be used for the authentication code the following equation:

CMAC value=Truncate(CMAC(CMAC_SIG_KEY_U,AKID|22 bits super frame number|2 bits frame index|STID|FID|counter value|16 bits zero padding|abnormal power down signaling header content),16).

16. The method of claim 9, wherein the values further comprise at least one of:
  a first value indicating a flow identifier (FID) set to 0b0010,
  a station ID (STID) of the M2M device,
  a second value indicating a length of the abnormal power down signaling header,
  a third value indicating an STID valid offset set to zero if the STID is assigned to only the M2M device, or
  a fourth value indicating an emergency type that is set to '0b1' if the emergency type is power outage.

17. A machine to machine (M2M) device for transmitting control information in a wireless communication system, the M2M device comprising:
  at least one hardware processor configured to generate an authentication key for authenticating control information based on an authentication code; and
  a transceiver configured to transmit the control information protected based on the authentication key, the control information comprising an indicator indicating whether the control information is protected using the authentication code,
  wherein the indicator indicates one of values comprising a first value indicating that the control information is protected using the authentication code and a second value indicating that the control information is not protected using the authentication code, and
  wherein the authentication key is generated using a predetermined function based on a TEK prekey and a CMACSIG.

18. The M2M device of claim 17, wherein the protected control information is recorded in an abnormal power down signaling header.

19. The M2M device of claim 18, wherein the at least one hardware processor is further configured to generate a new authentication key every predefined number of frames.

20. The M2M device of claim 17, wherein the at least one hardware processor is further configured to:
  increase a counter for a frame number, if a number of frames in which the protected control information is transmitted reaches a preset range, and
  reset the counter if a new authentication key is generated every predefined number of frames.

21. The M2M device of claim 17, wherein if the indicator indicates that the control information is protected using the authentication code, the control information further comprises at least one of information indicating a counter for a number of frames in which the protected control information is transmitted, or information indicating the authentication code.

22. The M2M device of claim 17, wherein the authentication key (CMAC SIG KEY U) is generated using the predetermined function (Dot16KDF) based on the TEK prekey (CMAC-TEK prekey, encryption key), the predefined constant CMACSIG (predefined constant) for the authentication key, and a length of input bit strings (128), by the following equation:

CMAC SIG KEY U=Dot16KDF(CMAC-TEK prekey,CMACSIG,128).

23. The M2M device of claim 17, wherein the authentication code (CMAC value) is generated using a predetermined function (Truncate), the authentication key (CMAC_SIG_KEY_U), an authorization key (AK) identifier (AKID), a flow identifier (FID), a station ID (STID) of the M2M device, a counter value for a number of frame in which the protected control information is transmitted, and 16 is the 16 least significant bits of an outcome of advanced encryption standard cipher based message authentication code (CMAC) calculation to be used for the authentication code, by the following equation:

CMAC value=Truncate(CMAC(CMAC_SIG_KEY_U,AKID|22 bits super frame number|2 bits frame index|STID|FID|counter value|16 bits zero padding|abnormal power down signaling header content),16).

24. The M2M device of claim 17, wherein the control information further comprises at least one of:
  a first value indicating a flow identifier (FID) set to 0b0010,
  a station ID (STID) of the M2M device,
  a second value indicating a length of the control information,
  a third value indicating a STID valid offset set to zero if the STID is assigned to only the M2M device, or
  a fourth value indicating an emergency type that is set to '0b1' if the emergency type is power outage.

25. A base station of receiving control information in a wireless communication system, the base station comprising:
  a transceiver configured to receive, from a machine to machine (M2M) device, the control information protected based on an authentication code, the control information comprising an indicator indicating whether the control information is protected using the authentication code; and
  at least one hardware processor configured to authenticate the control information using an authentication key generated based on values obtained from the control information,
  wherein the indicator indicates one of values comprising a first value indicating that the control information is protected using the authentication code and a second value indicating that the control information is not protected using the authentication code, and
  wherein the authentication key is generated using a predetermined function based on a TEK prekey and a CMACSIG.

26. The base station of claim 25, wherein the protected control information is recorded in an abnormal power down signaling header.

27. The base station of claim 25,
wherein if a frame number in which the protected control information is to be transmitted reaches a preset range, a counter for the frame number is increased, and
if a new authentication key is generated every predefined number of frames, the counter is reset.

28. The base station of claim 25, wherein a new authentication key is generated every predefined number of frames.

29. The base station of claim 25, wherein if the indicator indicates that the control information is protected using the authentication code, the values comprise at least one of:
information indicating a counter for a number of frames in which the protected control information is transmitted, or
information indicating the authentication code.

30. The base station of claim 25, wherein the authentication key (CMAC_SIG_KEY_U) is generated using the predetermined function (Dot16KDF) based on the TEK prekey (CMAK-TEK prekey, encryption key), the CMAC-SIG (predefined constant) for the authentication key, and a length of input bit strings (128), by the following equation:

CMAC SIG KEY U=Dot16KDF(CMAC-TEK prekey,CMACSIG,128).

31. The base station of claim 25, wherein the authentication code (CMAC value) is generated using a predetermined function (Truncate), the authentication key (CMAC_SIG_KEY_U), an authorization key (AK) identifier (AKID), a flow identifier (FID), a station ID (STID) of the M2M device, a counter value for a number of frames in which the protected control information is transmitted, and 16 is LSB (least significant bit) 16 bits of an outcome of advanced encryption standard cipher based message authentication code (CMAC) calculation to be used for the authentication code, by the following equation:

CMAC value=Truncate(CMAC(CMAC_SIG_
KEY_U,AKID|22 bits super frame number|2
bits frame index|STID|FID|counter value|16
bits zero padding|abnormal power down signaling header content),16).

32. The base station of claim 25, wherein the values further comprise at least one of:
a first value indicating a flow identifier (FID) set to 0b0010,
a station ID (STID) of the M2M device,
a second value indicating a length of the abnormal power down signaling header,
a third value indicating a STID valid offset set to zero if the STID is assigned to only the M2M device, or
a fourth value indicating an emergency type that is set to '0b1' if the emergency type is power outage.

* * * * *